Jan. 23, 1968   R. ALTSON   3,365,255
BEARING CAGE
Filed March 7, 1966   2 Sheets-Sheet 1
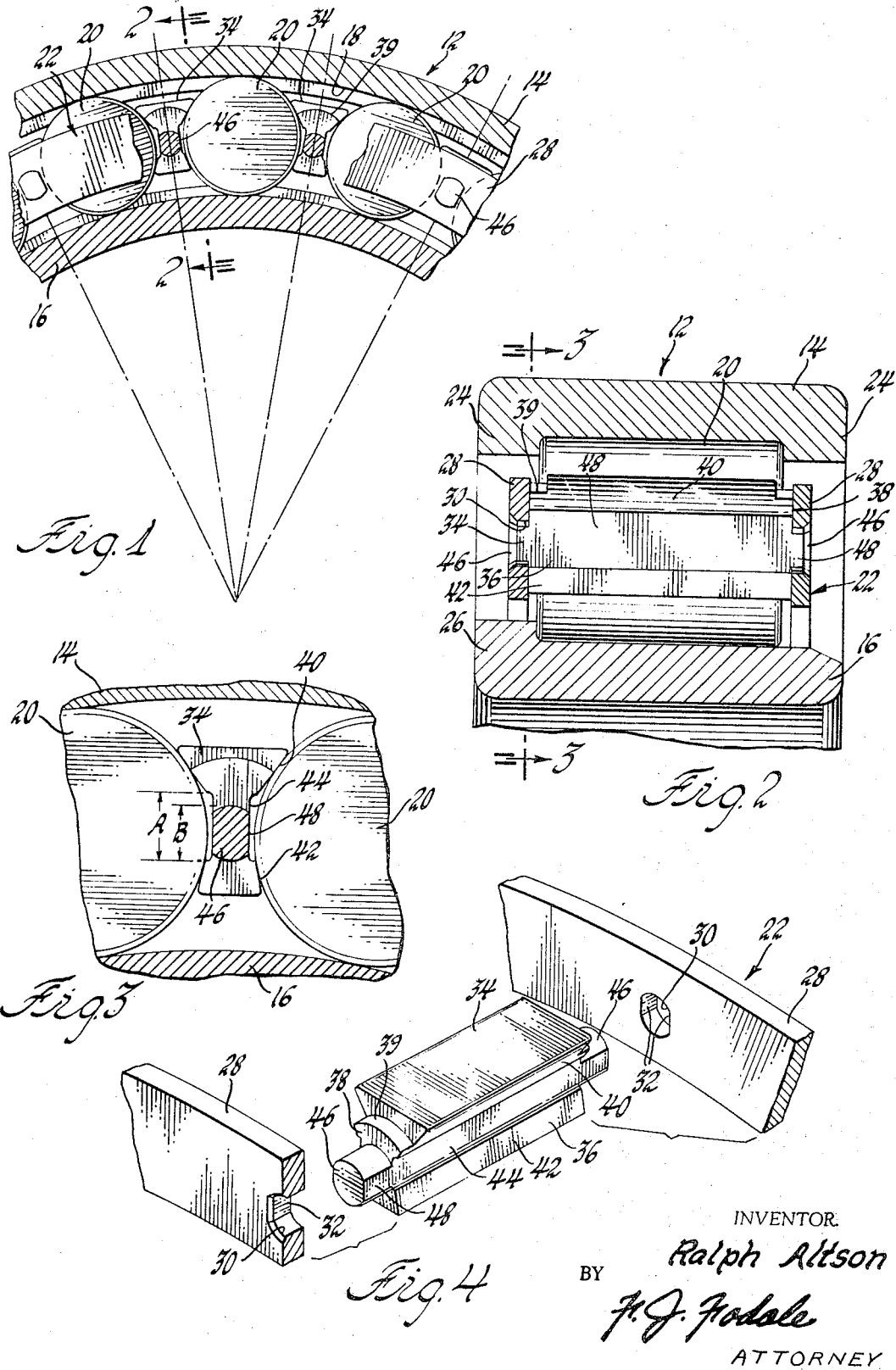
INVENTOR.
Ralph Altson
BY
F. J. Fodale
ATTORNEY Jan. 23, 1968  R. ALTSON  3,365,255
BEARING CAGE Filed March 7, 1966  2 Sheets-Sheet 2

INVENTOR.
Ralph Altson
BY
F. J. Fodale
ATTORNEY

United States Patent Office 3,365,255
Patented Jan. 23, 1968

3,365,255
BEARING CAGE
Ralph Altson, East Orange, N.J., assignor to General
Motors Corporation, Detroit, Mich., a corporation
of Delaware
Filed Mar. 7, 1966, Ser. No. 532,358
5 Claims. (Cl. 308—217)

My invention relates generally to bearing cages and more particularly to that type of cage in which the cross bars are separate pieces mounted to end rings rather than an integral part thereof. The load capacity of a particular bearing is directly proportional to the number of rolling elements which can be fit into the annular space between the inner and outer races while the speed capacity is affected by the amount of friction experienced by the rolling elements. In a given size, the bearing load capacity may be maximized by providing a full complement of rolling elements, that is, filling the entire annular space between the races with rolling elements. This configuration while maximizing the load capacity reduces the speed capacity of the bearing because of the frictional contact of adjacent rolling elements. The inclusion of a cage to circumferentially space and/or retain the rolling elements increases the speed capacity of the bearing but sacrifices some of the load capacity of the bearing since the space occupied by the cage reduces the space available for the rolling elements and, consequently, the number of rolling elements.

My invention is generally directed toward providing a bearing cage which takes up a minimum amount of space thus minimizing the number of rolling elements which are displaced from a full complement configuration. In other words, my cage is designed to provide a bearing having a cage for higher speeds which approaches the load capacity of a full complement bearing. It is also an object of my invention to provide a roller bearing cage designed for the production of a family of bearing cages so that some of the parts and tooling can be utilized to provide cages for various size bearings.

Another object of my invention is to provide a bearing cage for retaining and spacing the rolling elements and in which the frictional contact between the cage cross bars and the rolling elements is minimized.

Another object of my invention is to provide a bearing cage in which the cross bars are nonrotatably mounted to the end rings so that the cross bars will not rotate in service causing excessive wear and premature failure.

Another object of my invention is to provide a bearing cage in which the cross bar nonrotatable mounting points can be provided at various depths to accommodate their incorporation into bearing cages for various size bearings.

To these ends and also to improve generally upon the devices of this character, my invention consists in the various matters hereinafter described and claimed in its broader aspects. The invention is not necessarily limited to the specific structures selected for illustrative purposes in the accompanying drawings wherein:

FIGURE 1 is an elevation view partially in cross section of a roller bearing provided with a cage in accordance with my invention.

FIGURE 2 is a section taken along the line 2—2 of FIGURE 1 and looking in the direction of the arrows.

FIGURE 3 is a section taken along the line 3—3 of FIGURE 2 and looking in the direction of the arrows.

FIGURE 4 is an exploded perspective view showing the relationship between a cross bar and the end rings of the cage shown in FIGURE 1.

Figure 5:
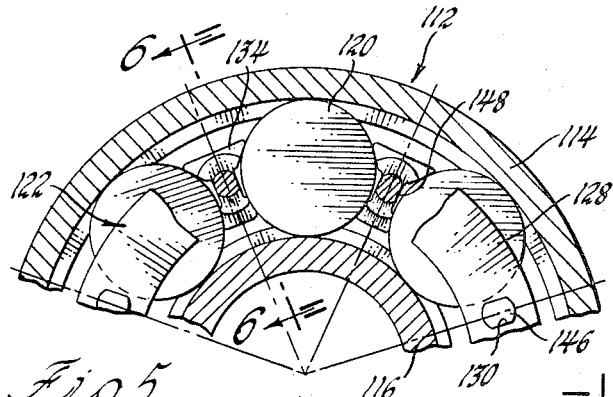
FIGURE 5 is an elevation view partly in cross section of a bearing of much smaller diameter than that shown in FIGURE 1 and which includes a cage in accordance with my invention.
Figure 6:
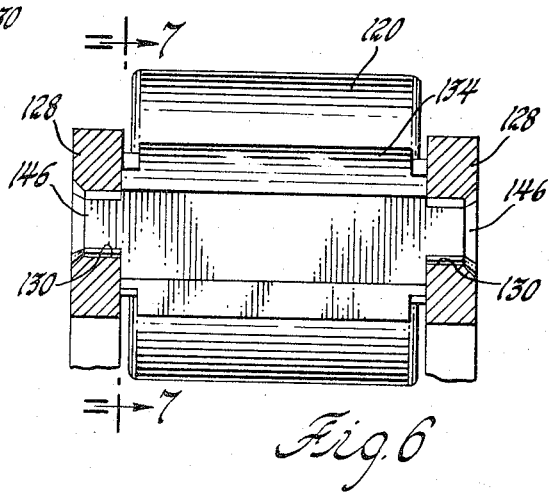
FIGURE 6 is a section taken along the line 6—6 of FIGURE 5 and looking in the direction of the arrows.

Referring now to the drawings and more particularly to FIGURE 1, the roller bearing 12 comprises the usual relatively rotatable outer race 14 and inner race 16 defining an annular space 18 in which is disposed a number of rollers 20 separated by a cage 22.

Referring to FIGURE 2, the bearing which I have illustrated is of the type wherein the outer race 14, the rollers 20, and the cage 22 are in a unit handled relationship with the inner race 16 being demountable. More specifically, the outer race 14 has end flanges 24 which prevent the axial movement of the rollers 20 once they have been assembled to the outer race 14 by the cage 22 which spaces as well as retains them. On the other hand, the inner race 16 has a flange 26 at the left side only as viewed in the drawing so that it may be withdrawn axially from the left.

Referring now to FIGURE 4, the cage 22 comprises a pair of axially spaced end rings 28 having a number of circumferentially spaced holes 30. The outline of these holes is a circular zone, that is, they are in the shape of a circle intersected by a pair of parallel chords so that the walls defining the holes 30 include two parallel flat surfaces 32.

Referring back momentarily to FIGURE 2, it is seen that the outer ends of these holes taper outwardly. The function of this taper will be explained later.

The cage 22 includes a number of cross bars 34, a typical one being shown in FIGURE 4. The cross bar 34 has side walls 36 and end walls 38. The radially outer portion 40 on the side wall 36 is flat and tangent to the rollers 20 so that there is line contact therebetween. See FIGURE 3. Likewise the radial inner portion 42 on the side wall 36 is flat and tangent to the roller 20. These two portions are joined by an undercut intermediate flat portion 44 which extends between the portions 40 and 42 and does not contact the roller 20. Thus there is only line contact between the cross bar 34 and the right hand roller 20 at two places. The width of the cross bars 34 is relatively narrow so that a minimum amount of space is taken up by them.

Returning to FIGURE 4, it is seen that the upper ends of the end walls 38 are recessed to provide a shoulder 39 and that a shank 46 protrudes axially from the unrecessed portion of each end wall 38. The shank 46 has an outline which is also a circular zone so that it also contains a pair of parallel flat surfaces 48; these flat surfaces being continuous with the flat intermediate side wall surface 44 for two reasons—first, to increase the area of the shank 46 and, consequently, the load it will carry in shear, and secondly, to simply manufacture because the surfaces 44 and 48 can be machined by the same operation. Note from FIGURE 3 that the radial height A of the flat wall 44 is greater than the radial height B of the shank 46. The reason for this will become more apparent later.

In assembling the cage, the shanks 46 are disposed in the holes 30 and headed over so that their widened outer ends prevent their withdrawal from the end rings 28. See FIGURE 2.

Referring now to FIGURE 5, I have shown a cage in accordance with my invention for use with a bearing of much smaller diameter than that shown in FIGURE 1. Most of the structure of the bearing illustrated in FIGURE 5 is identical to that shown in FIGURE 1 except for size and so a description need not be repeated. Like parts are identified by adding 100 to the numbers identifying the corresponding parts in FIGURES 1 through 4.

Figure 7:
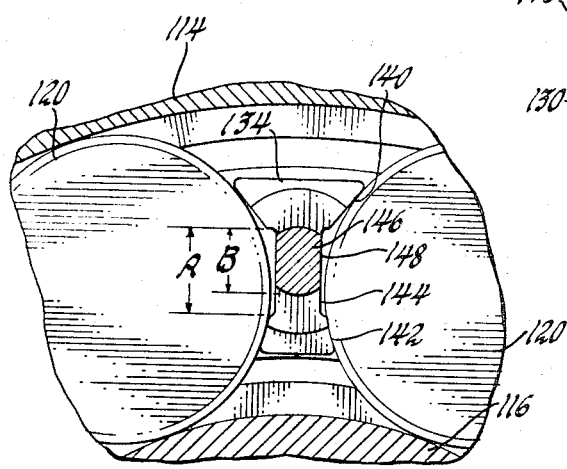
FIGURE 7 is a section taken along the line 7—7 of FIGURE 6 and looking in the direction of the arrows.
Figure 8:
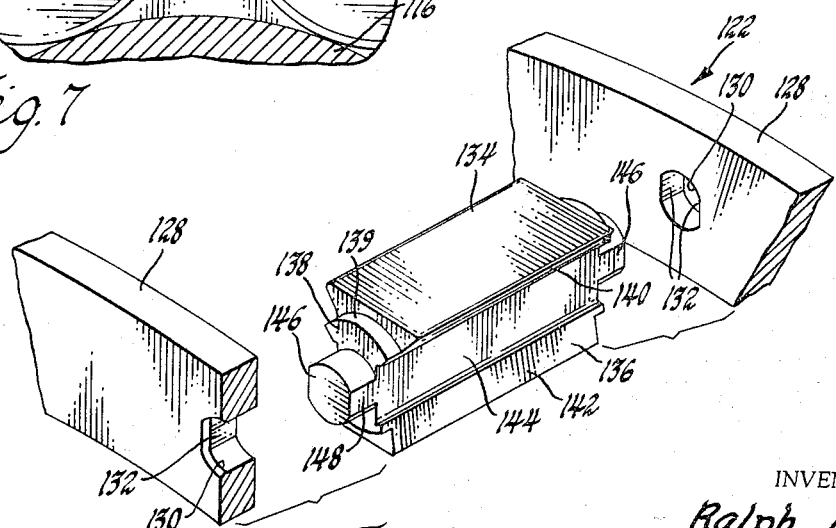
FIGURE 8 is an exploded perspective view showing the relationship between a cross bar and the end rings of the cage shown in FIGURE 5.

Referring now to FIGURE 7, the difference will be pointed out. Note that the shank 146 while still having a radial height B smaller than the radial height A of the flat intermediate walls 144 is in a different position with respect to the wall 144. It is higher with respect to the wall 144 than is the shank of FIGURE 3. Thus we come to the function of the height difference between the shank 148 and the wall 144 which was alluded to earlier. By providing an intermediate portion on each cross bar which is bounded by the flat undercut intermediate walls 144 and the corresponding area of the end walls 138 which is of a greater radial height than the shank, I can vary the position of the shank on the cross bars within this intermediate portion so that there will always be an adequate amount of metal between the holes 130 and the circumferential edges of the end rings 128 to sustain a load. Note from FIGURE 5 that if the shanks 146 were in the same relative position as the shanks 48 that the hole 130 would be too close to the inner circumferential surface of the ring 128. Also since the shank 146 is always on this intermediate portion so that the walls 144 and 148 are continuous, the construction of the cross bar 34 is simplified since both surfaces can be machined by the same operation.

Thus it can be seen that I have provided a retaining type bearing cage designed for the production of a family of bearings and in which the cross bars are nonrotatably mounted and in minimum frictional contact with the rolling elements for increased bearing life.

I claim:

1. A bearing cage comprising: a pair of axially spaced end rings having a plurality of circumferentially spaced aligned holes, the contour of said holes including a flat segment, and a plurality of cross bars extending between said end rings to form pockets adapted to receive a rolling element of circular outline, said cross bars having end walls and side walls, said side walls having flat radially inner and outer portions, said portions being substantially tangent to the circular outline of said rolling element, an intermediate portion on said side wall between said radially inner and outer portions, said intermediate portion being spaced from said outline and being of greater radial height than said holes, a shank extending axially from that portion of each of said end walls having a common edge with said intermediate side wall portions, a flat axial surface on said shanks, said shanks being disposed in said holes with said flat surfaces abutting said flat segments whereby said cross bars are nonrotatably mounted to said end rings.

2. The bearing cage as defined in claim 1 wherein said contour of said holes includes two parallel flat segments, and wherein said shank has two parallel flat axial surfaces.

3. The bearing cage as defined in claim 2 wherein the intermediate portions on said cross bar side walls are flat and wherein the parallel flat axial surfaces on said shanks are continuous with said flat intermediate portions respectively.

4. The bearing cage as defined in claim 2 wherein the contour of said holes and the outline of said shanks are circular zones.

5. The bearing cage as defined in claim 3 wherein the contour of said holes and the outline of said shanks are circular zones.

References Cited

FOREIGN PATENTS 390,338   10/1908   France.

MARTIN P. SCHWADRON, *Primary Examiner.*

FRANK SUSKO, *Assistant Examiner.*